Patented Oct. 20, 1936

2,058,180

UNITED STATES PATENT OFFICE 2,058,180

COMPOUNDS OF METALLOIDS WITH NUCLEOTIDES AND THEIR DECOMPOSITION PRODUCTS

Simon L. Ruskin, New York, N. Y., assignor to Frances R. Ruskin, New York, N. Y.

No Drawing. Application November 2, 1933, Serial No. 696,389

5 Claims. (Cl. 260—9)

This invention relates to organic compounds of metalloids and non-metals and more particularly to compounds of metalloids and non-metals with isolated nucleotides and their isolated organic hydrolytic decomposition products which contain a pyrimidine ring in their molecule; it is a continuation in part of my copending application Serial #650,137, filed January 4, 1933.

One object of this invention is to provide a method for producing metalloid compounds of isolated nucleotides or their isolated organic hydrolytic decomposition products which contain a pyrimidine ring, such as the nucleosides, or the purine and pyrimidine bases derived therefrom.

Another object of this invention is the preparation of soluble compounds of metalloids and non-metals with nucleotides or their organic hydrolytic decomposition products which contain a pyrimidine ring, such as the nucleosides, or the purine and pyrimidine bases derived therefrom, which compounds are soluble in water or physiological salt solutions and contain a high percentage of said metalloids and non-metals.

Still another object of my invention is the preparation of soluble compounds of arsenic with nucleotides or their organic hydrolytic decomposition products which contain a pyrimidine ring, such as the nucleosides, or the purine and pyrimidine bases derived therefrom, which compounds are soluble in water or physiological salt solutions and contain a high percentage of arsenic.

A further object of my invention is the preparation of soluble compounds of antimony with nucleotides or their organic hydrolytic decomposition products which contain a pyrimidine ring, such as the nucleosides, or the purine and pyrimidine bases derived therefrom, which compounds are soluble in water or physiological salt solutions and contain a high percentage of antimony.

Still another object of my invention is the preparation of soluble compounds of halogens with nucleotides or their organic hydrolytic decomposition products which contain a pyrimidine ring, such as the nucleosides, or the purine and pyrimidine bases derived therefrom, which compounds are soluble in water or physiological salt solutions and contain a high percentage of halogens.

A further object of this invention is the preparation of soluble compounds of selenium with nucleotides or their organic hydrolytic decomposition products which contain a pyrimidine ring, such as the nucleosides, or the purine and pyrimidine bases derived therefrom, which compounds are soluble in water or physiological salt solutions and contain a high percentage of selenium.

Other objects of this invention are to combine other non-metals, such as sulfur, tellurium, phosphorus, silicon, boron and the like with nucleotides or their organic hydrolytic decomposition products which contain a pyrimidine ring, such as the nucleosides, or the purine and pyrimidine bases derived therefrom, which compounds are soluble in water or physiological salt solutions and contain a high percentage of said non-metals.

Under the expression "nucleotides" I include their organic hydrolytic decomposition products which contain a pyrimidine ring, such as the nucleosides, or the purine and pyrimidine bases derived therefrom and also compounds which are obtained from nucleoproteins by hydrolysis. The nucleotides are composed of "nucleosides" and phosphoric acid and are acids; they are decomposed by the action of hot water, ferments, acids or alkalies. Some mononucleotides were isolated from pancreas and from extract of meat.

The "nucleosides" which, in combination with phosphoric acid, form the nucleotides, are glucosides of various purine and pyrimidine bases, i. e., compounds composed of carbohydrates and these bases. They are obtained by the action of ferments upon said nucleotides and are finally decomposed into the various "purine" and "pyrimidine" bases, of which the following may be mentioned: thymin, cytosin, uracil, adenin and guanin. These final hydrolytic decomposition products, of course, have also been produced directly from nucleoproteins, nucleine and nucleotides by the action of acids or alkalies.

As the chemical constitution and the nomenclature of the compounds comprising the object of this invention are still in a state of considerable confusion, the following table is intended to give a clearer picture of the scope of the invention and the relationship existing between all these compounds.

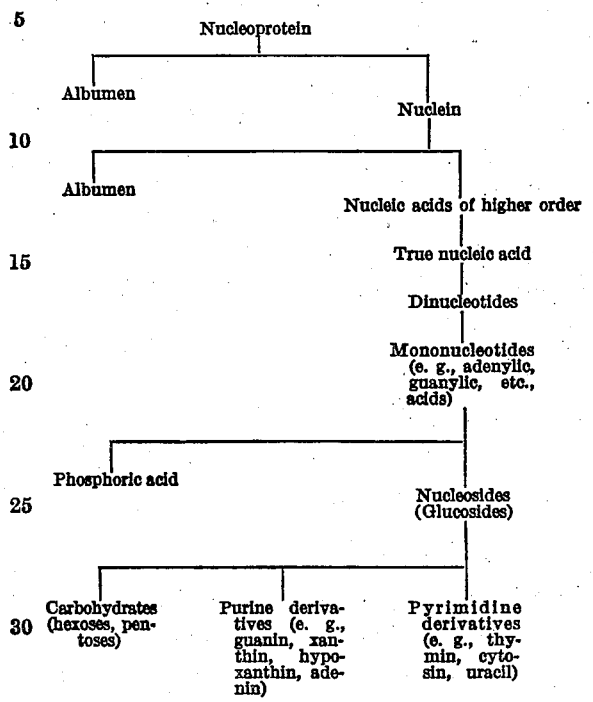

Of course, the invention comprises not only the isolated compounds as obtained by hydrolytic decomposition of nucleoproteins, but also those compounds which are produced synthetically, i. e., in the reverse order of the table.

For the purpose of disclosing my invention I will describe the preparation of the combination of iodine with a mononucleotide (guanylic acid), of arsenic with adenin, of antimony with a mixture of nucleotides and of selenium with adenosin (adeninriboside) without, however, limiting myself to these products.

*Example 1*

10 grams of finely pulverized guanylic acid are suspended in chloroform. An equimolecular amount of iodine dissolved in chloroform is slowly added to this solution while stirring vigorously and keeping the temperature below 25° C. After about ½ hour the reaction product is separated from the solvent and dried at about room temperature in a vacuum. The compound contains between 10 to 15% of iodine.

Instead of iodine, solutions of chlorine or bromine may be used. Or the reaction may be carried out by passing the halogen vapors over the guanylic acid which is preferably arranged in thin layers or is kept in a rotating drum. The latter method is especially suitable for the preparation of chlorine and fluorine compounds.

Instead of using chloroform as solvent, other indifferent solvents may be used, such as benzene, toluene, xylene, carbontetrachloride and the like. The reaction may also be carried out in aqueous solution or by treating the solutions of metal salts or even the dry metal salts of the nucleotides and their organic hydrolytic decomposition products with halogens either in the molecular state or in statu nascendi.

*Example 2*

The iodo compound of adenin obtained according to Example 1 by reacting adenin with iodine in solution in an indifferent solvent, is treated with an aqueous solution of sodium arsenite. The adenin arsonic acid is obtained which can be transformed into its soluble disodium salt and which can be used with advantage for the treatment of skin diseases, malaria or syphilis, or as a very powerful disinfectant.

These arsenic compounds may be obtained by other methods, for instance, by reacting arsenic trichloride dissolved in alcohol with finely pulverized nucleotides or their organic hydrolytic decomposition products which contain a pyrimidine ring. Such arsenic compounds are soluble in water and alkalies. Arsenic compounds are also obtained by mixing aqueous solutions of arsenic acid and nucleotides and precipitating by means of alcohol.

On combination of such arsenic nucleotide compounds with, for instance, heavy metals, such as gold, mercury, silver and the like, other valuable products are obtained which are superior to and less poisonous than the hitherto known and used arsenic compounds.

*Example 3*

A mixture of nucleotides comprising guanylic and adenylic acid as it is obtained by hydrolysis of nucleic acid with ammonia in an autoclave at 150° C. and repeated recrystallization, is dissolved in a salt solution, such as for instance in a solution of sodium chloride. Hereto is added a solution of antimony trichloride in aqueous sodium chloride solution. The mixture is boiled and the antimony compound of the nucleotide is precipitated by the addition of hydrochloric acid. It forms easily soluble sodium salts which may be used for the treatment of infections caused by trypanosamae and spirochaetae, such as syphilis, sleeping sickness and the like.

*Example 4*

Adenosin (adenin riboside) in suspension in an inert solvent such as carbon tetrachloride is reacted with selenotetrachloride while stirring vigorously and cooling to room temperature and the obtained chlorinated seleno-compound of adenosin is treated at rom temperature with diluted alkalies. On acidifying a compound is obtained which is easily soluble in alkalies and, although to a lesser degree, in water. Such a compound is of value in the treatment of neoplastic diseases and the like.

Likewise all the other not mentioned compounds of metalloids and non-metals may be produced, such as phosphorus, sulfur, tellurium, silicon, boron and the like compounds of nucleotides or their organic hydrolytic decomposition products which contain a pyrimidine ring, such as the nucleosides, or the purine and pyrimidine bases derived therefrom.

The reaction conditions may be changed and also other variations may be made by those skilled in the art in accordance with the principles set forth herein and in the claims annexed hereto.

What I claim is:
1. As a therapeutic agent, the combination of an element of the group VB of the periodic system and a compound of the group consisting of isolated nucleotides and their isolated decomposition products containing a pyrimidine ring.

2. As a therapeutic agent, the combination of an isolated nucleotide and arsenic.

3. As a therapeutic agent, the combination of an isolated nucleotide and antimony.

4. As a therapeutic agent, the combination of an element of the group VB of the periodic system and an isolated nucleotide having a purine ring in its structure.

5. As a therapeutic agent, the combination of isolated adenylic acid and arsenic.

SIMON L. RUSKIN.